United States Patent [19]
Kincaid et al.

[11] Patent Number: 6,139,594
[45] Date of Patent: Oct. 31, 2000

[54] ABRASIVE ARTICLE WITH TIE COAT AND METHOD

[75] Inventors: Don H. Kincaid, Hudson, Wis.; Scott R. Culler, Burnsville, Minn.; Larry R. Krepski, White Bear Lake, Minn.; Daniel E. Mickus, Mahtomedi, Minn.

[73] Assignee: 3M Innovative Properties Company, St. Paul, Minn.

[21] Appl. No.: 09/059,118

[22] Filed: Apr. 13, 1998

[51] Int. Cl.$^7$ .............................. B24D 3/02; B24D 11/00; B24D 11/04
[52] U.S. Cl. .................. 51/295; 51/298; 51/307; 51/309
[58] Field of Search ............................... 51/295, 298, 307, 51/309

[56] References Cited

U.S. PATENT DOCUMENTS

| | | |
|---|---|---|
| 4,772,716 | 9/1988 | Mülhaupt et al. . |
| 5,152,917 | 10/1992 | Pieper et al. ................. 51/295 |
| 5,203,884 | 4/1993 | Buchanan et al. ............ 51/295 |
| 5,435,816 | 7/1995 | Spurgeon et al. ............ 51/295 |
| 5,633,068 | 5/1997 | Ryoke et al. . |
| 5,669,940 | 9/1997 | Stubbs . |
| 5,672,185 | 9/1997 | Ryoke . |
| 5,700,302 | 12/1997 | Stoetzel et al. .............. 51/295 |
| 5,711,772 | 1/1998 | Ryoke et al. . |

FOREIGN PATENT DOCUMENTS

WO 97/03101  1/1997  WIPO .

OTHER PUBLICATIONS

Patent Abstracts of Japan, vol. 095, No. 8, Sep. 29, 1995, Japanese Pat. No. 07138336 A, May 30, 1995.

*Primary Examiner*—Michael Marcheschi
*Attorney, Agent, or Firm*—Scott R. Pribnow

[57] ABSTRACT

An abrasive article is provided that includes a tie coat which improves adhesion between an abrasive layer and a backing in the abrasive article. The tie coat is preferably formed from a tie coat precursor comprising a sulfopoly(ester-urethane) component comprising in its backbone at least one non-terminal arylene or alkylene group comprising a pendant sulfonic acid group or salt thereof having the formula:

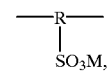

wherein R is a trivalent aliphatic or aromatic group and M is a cation, said aliphatic or aromatic group being bonded directly to ester groups and wherein the polymer is terminated by at least one hydrolyzable silyl group. Preferably, the abrasive article is a structured abrasive article. Also provided is a method for making an abrasive article.

29 Claims, 1 Drawing Sheet

ABRASIVE ARTICLE WITH TIE COAT AND METHOD

FIELD OF THE INVENTION

This invention relates to abrasive articles, particularly to structured abrasive articles, having a tie coat that enhances adhesion of the abrasive layer to the backing.

BACKGROUND OF THE INVENTION

Conventional coated abrasive articles comprise a backing having a plurality of abrasive particles bonded to at least one major surface thereof by means of one or more binders (e.g., make, size, and supersize coats). Slurry coated abrasive articles, such as structured abrasive articles comprise a backing bearing on at least one major surface thereof an abrasive layer comprising a plurality of abrasive particles dispersed in a binder. For a structured abrasive, the abrasive layer is in the form of a plurality of shaped abrasive composites bonded to a backing. The backing can be paper, polymeric film, vulcanized fibre, nonwoven substrates, cloth, and combinations thereof. Cloth backings are typically either stitchbonded or woven. These backings are often treated with treatment coat(s) to seal the cloth and to protect the individual fibers. The particular treatment coat chemistry and weight will modify the physical properties of the resulting backing.

Cloths made from synthetic fibers (e.g., polyester, rayon, or nylon) are popular abrasive backings due to their strength, tear resistance, and/or flexibility. however, it is sometimes difficult to adhere binders and treatment coats properly to cloth backings. If these binders and treatment coats do not adhere properly, during abrading they will separate from the backing's fibers, which results in the release of abrasive particles. This phenomena is known in the abrasive art as shelling (i.e., the premature release of abrasive particles from the backing). In most cases, shelling is undesirable because it results in a loss of performance.

For many years, conventional cloth backed coated abrasive articles utilized one or more treatment coats consisting of animal glues, starches, latices, thermally curable resins such as phenolic-based treatment coats or phenolic/latex treatment coats, and thermally cured phenolic-based binders in the abrasive coating. These combinations result in generally good adhesion between the treatment coat(s) and the fibers in the cloth backing and between the abrasive binder and the treatment coat(s). In recent years, some coated abrasive articles, particularly structured abrasive articles as disclosed in U.S. Pat. Nos. 5,152,917 (Pieper et al.) and 5,435,816 (Spurgeon et al.) have begun employing radiation cured binder systems, such as acrylate-based binders, in the abrasive layer instead of the phenolic-based binders. U.S. Pat. No. 5,700,302 (Stoetzel et al.) employs a radiation cured binder system, such as acrylate-based binders, in both an abrasive layer and a tie coat interposed between the abrasive layer and the backing.

SUMMARY OF THE INVENTION

What is desired by the abrasive industry is treating coats that will tenaciously adhere to fabrics. Besides the necessary adhesion between the treating coat and the backing, the treating coat must also have adhesion to the binder in the abrasive layer. If there is poor adhesion between the treating coat and the abrasive binder, this can also lead to shelling.

The present invention provides an abrasive article comprising a cloth backing having a first major surface and a tie coat on the first major surface of the backing formed from a tie coat precursor comprising a sulfopoly(ester-urethane) component comprising in its backbone at least one non-terminal arylene or alkylene group comprising a pendant sulfonic acid group or salt thereof having the formula:

wherein R is a trivalent aliphatic or aromatic group and M is a cation, said aliphatic or aromatic group being bonded directly to ester groups and wherein the component is terminated by at least one hydrolyzable silyl group. Also included in an abrasive article in accordance with the present invention is an abrasive layer on the tie coat, wherein the abrasive layer is formed from a plurality of abrasive particles dispersed within a binder precursor. Preferably, this article is a structured abrasive article.

More preferably, the tie coat binder precursor comprises a sulfopoly(ester-urethane) component has the structural formula:

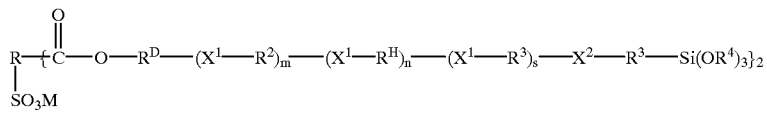

wherein

R is a $C_6$–$C_{12}$ aryltriyl or $C_1$–$C_{20}$ aliphatic triyl group and M is a cation, or

is selected from the group consisting of:

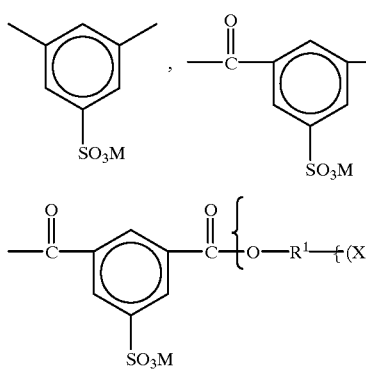 , 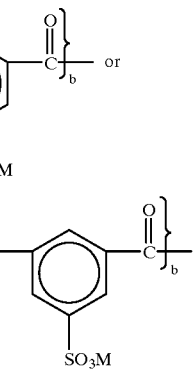 or

wherein a is a number from 1 to 10,
b is a number from 1 to 4, and
c is a number from 1 to 15,
wherein m=0 or 1, n=0 or 1, s=0 or 1, with the proviso that independently, one of m or n must be equal to 1,
$R^D$ is 1) at least one of a divalent linear or branched organic group of 20 to about 150 carbon atoms in units of 2 to 12 methylene groups and arylene groups of 6 to 10 carbon atoms separated by at least one of 1 to 50 catenary oxygen atoms and by 1 to 30 oxycarbonyl groups,

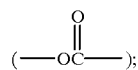

or $R^D$ is 2) an organic group selected from the group consisting of a linear or branched alkylene group having 2 to 12 carbon atoms, a cyclopentamethylene group, a cyclohexamethylene group, a 5- or 6-membered azacyclic group, a phenylene group, a naphthalene group, a phenylenemethylenephenylene group, the organic group optionally being substituted by up to four lower alkyl groups having 1 to 4 carbon atoms and a total of up to 15 carbon atoms; or $R^D$ includes 3) the structure $\{-R^1-(X^1-R^2-X^1-R^1)_p-\}$ where p is an integer from 1 to 5, produced by the reaction of a polyol with an isocyanate having the structure $OCN-R^2-NCO$ to produce a segment having a molecular weight of from 500 to 4,000;

$R^1$ is a linear or branched alkylene group having 2 to 12 carbon atoms, or an arylene group having 6 to 10 carbon atoms; $X^1$ is —OCNH—, —NHCNH—, or —OC—;

wherein $R^1$ optionally comprises an oligomeric segment;

$R^2$ is an organic group wherein the organic group optionally is substituted by up to four lower alkyl groups having 1 to 4 carbon atoms and a total of at most 15 carbon atoms;

$X^2$ is

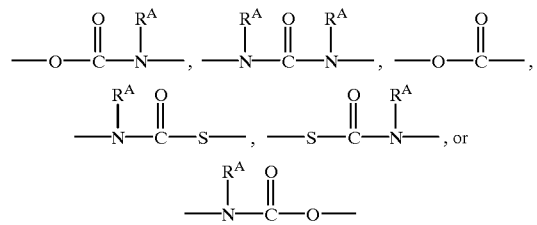

wherein $R^A$ is hydrogen or lower alkyl having 1 to 4 carbon atoms;
$R^H$ is a divalent hydrophobic group selected from divalent oligomeric siloxanes having the structure

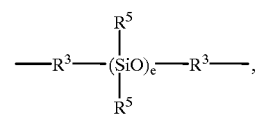

divalent organic groups having the structure

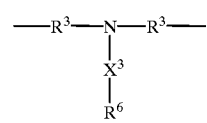

comprising a pendant alkyl group,
or divalent organic groups having one of the structures

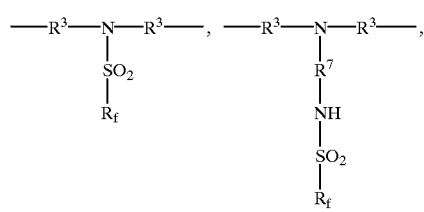

or quaternary salts thereof,
wherein $R_f$ is a fluorocarbon pendant group; and
$R^3$ is a divalent organic group, preferably linear or branched alkylene group having 2 to 12 carbon atoms, but it can also be an arylene, such as phenylene or an alkarylene group, each having 6 to 20 carbon atoms;

R⁴ is a monovalent lower alkyl group having from 1 to 4 carbon atoms;

R⁵ is a monovalent group selected from the group consisting of alkyl groups of one to about twelve carbon atoms, aryl having 6 to 10 carbon atoms, or aralkyl groups having 6 to 10 carbon atoms, with at least 70% of R⁵ being methyl;

e is an integer of from about 10 to about 300;

X³ is a covalent bond, a carbonyl group,

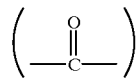

or an amide group

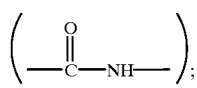

R⁶ is a monovalent group selected from the group consisting of alkyl groups of about 4 to about 60 carbon atoms, preferably 12 to 30 carbon atoms; and R⁷ is a divalent group selected from the group consisting of alkylene groups of 2 to about 12 carbon atoms.

Preferably, R¹ further comprises an oligomeric segment selected from the group of a polyester or a polylactone segment. M is preferably selected from the group of an alkali metal, an alkaline earth metal, a primary ammonium cation, a secondary ammounium cation, a tertiary ammonimum cation, and a quaternary ammonium cation. More preferably, the primary, secondary, tertiary, or quaternary ammonium cation are selected from the group consisting of ammonium, methylammonium, butylammonium, diethylammonium, triethylammonium, tetraethylammonium, and benzyltrimethylammonium cation, respectively.

Typically, it is preferred that when R is aliphatic it is an alkylene group.

Preferably, the organic group of R^D as recited above in "2)" is chain extended by a transesterification reaction between a diol terminated ester precursor and a lower aliphatic diester of an aliphatic diacid having from 2 to 12 carbons or an aromatic diacid having from 8 to 12 carbons or reaction between a diol terminated ester precursor and an aliphatic lactone of 3 to 20 carbons.

Preferably, the organic group of R² is selected from the group consisting of a linear or branched alkylene group having 2 to 12 carbon atoms, a cyclopentamethylene group, a cyclohexamethylene group, a 5- or 6-membered azacyclic group, a phenylene group, a naphthalene group, a phenylenemethylenephenylene group, or arylene group. More preferably, the organic group is selected from the group consisting of a residue remaining after removal of the isocyanate groups from a polyisocyanate selected from the group consisting of hexamethylene diisocyanate, bis(4-isocyanatocyclohexyl)methane, 1,3-bis(isocyanatomethyl)cyclohexane, isophorone diisocyanate, and 1,3-bis(1-isocyanato-1-methylethyl)benzene, 4,4'-diphenylmethane diisocyanate; or a residue remaining after removal of the isocyanate groups from isocyanates produced by the trimerization reactions of diisocyanates.

$R_f$ preferably comprises a monovalent saturated fluoroaliphatic group having 6 to 12 carbon atoms, at least four of which are fully-fluorinated carbon atoms.

Preferably, the backing comprises a material selected from the group consisting of a polymeric film, a cloth, a paper, a vulcanized fiber, a nonwoven web, and a combination thereof and, more preferably, the backing comprises a treated cloth backing. The backings mentioned above can include a treatment coat selected from the group consisting of a saturant coat, a presize coat, a backsize coat, a subsize coat, a backfill coat, a frontfill coat, and a combination thereof.

In one preferred embodiment, the abrasive layer includes a structured surface and, more preferably, the structured surface includes a plurality of precisely shaped composites.

The binder precursor utilized to form the abrasive layer preferably includes a material that is capable of curing by a mechanism selected from the group consisting of a cationic curing system, a free-radical curing system, a dua-cure system, and a hybrid-cure system. In one embodiment, the binder precursor comprises an acrylate monomer and an isocyanurate derivative having at least one pendant acrylate group.

Also provided is a method for making an abrasive article comprising: coating a first major surface of a backing with a tie coat precursor, wherein the tie coat precursor comprises a sulfopoly(ester-urethane) component comprising in its backbone at least one non-terminal arylene or alkylene group comprising a pendant sulfonic acid group or salt thereof having the formula:

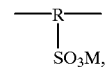

wherein R is a trivalent aliphatic or aromatic group and M is a cation, said aliphatic or aromatic group being bonded directly to ester groups and wherein the polymer is terminated by at least one hydrolyzable silyl group. Also included in the method are the steps of applying an abrasive slurry to the first major surface of the backing after coating the tie coat precursor thereon, wherein the abrasive slurry comprises a plurality of abrasive particles dispersed in a binder precursor; at least partially curing the tie coat precursor; and at least partially curing the binder precursor to form an abrasive article.

The step of at least partially curing the tie coat precursor preferably occurs prior to the step of applying an abrasive slurry. Thus, when the abrasive slurry is applied to the first major surface of the backing, the tie coat precursor is preferably at least partially cured, and more preferably, substantially completely cured. The phrase "tie-coated backing" is therefore used herein to refer to the backing when the abrasive slurry is coated thereon, and encompasses the embodiments wherein the backing is coated with a partially cured tie coat precursor, or, more preferably, a substantially completely cured tie coat. The step of at least partially curing the tie coat precursor preferably includes exposing the tie coat precursor to thermal energy. Preferably, the method further includes a step of exposing the abrasive article to thermal energy after at least partially curing the binder precursor.

The present invention also provides a method of preparing an abrasive article, the method comprising: providing a cloth backing having a first major surface; coating the first major surface of the cloth backing with a tie coat precursor, wherein the tie coat precursor comprises a sulfopoly(ester-urethane) component comprising in its backbone at least one non-terminal arylene or alkylene group comprising a pendant sulfonic acid group or salt thereof having the formula:

wherein R is a trivalent aliphatic or aromatic group and M is a cation, said aliphatic or aromatic group being bonded directly to ester groups and wherein the polymer is terminated by at least one hydrolyzable silyl group. The method also includes applying an abrasive slurry onto the first major surface of the cloth with the tie coat precursor, wherein the abrasive slurry comprises a plurality of abrasive particles and a binder precursor; providing a radiation energy transmissive production tool having a contacting surface; causing the abrasive slurry on the first major surface of the cloth to come into contact with the production tool; at least partially curing the tie coat precursor; transmitting radiation energy through the production tool to at least partially cure the binder precursor to form a shaped, handleable structure; and separating the shaped, handleable structure from the production tool to form an abrasive article, wherein the abrasive article comprises a treated cloth backing, an abrasive layer, and a tie coat disposed between the treated cloth backing and the abrasive layer.

As used herein, a shaped, handleable structure refers to the abrasive slurry when the binder precursor contained therein is at least partially cured, such that it is solidified sufficiently to be removed from the production tool without substantially losing the topographical pattern imparted by the production tool.

For some applications, the adhesion between conventional backing treatment coats, e.g., saturant coats, presize coats, and the like, and radiation cured binders is not as strong as desired, sometimes resulting in shelling, depending on the particular abrading application such as that in a wet abrading environment. This is true particularly when it is desired to use a continuous manufacturing process for making the abrasive article wherein relatively high processing speeds are used. Thus, the present invention provides abrasive article that includes a backing, preferably a cloth backing, and an abrasive layer wherein the abrasive article exhibits good durability in a variety of abrading environments (e.g., a wet and/or dry environment) and can be produced in a continuous manufacturing process using relatively high processing speeds.

Also provided is an abrasive article made by any one of the methods mentioned above.

In this application:
"aliphatic group" means straight chain and branched acyclic and non-aromatic cyclic hydrocarbons having up to 20 carbon atoms;
"alkyl" and "alkylene" groups mean the monovalent and divalent residues remaining after removal of one or two hydrogen atoms, respectively, from a linear or branched hydrocarbon having 1 to 20 carbon atoms;
"aromatic group" means any group having one or more unsaturated carbon rings having 5 to 12 carbon atoms;
"aromatic ester" means an ester group derived from an aryl or arylene carboxylic acid and an aliphatic alcohol;
"aryl" and "arylene" groups mean the residues remaining after the removal of one or two hydrogen atoms, respectively, from an aromatic compound (single ring and multi- and fused-rings) having 5 to 12 ring atoms and includes substituted aromatics such as lower alkaryl and aralkyl, lower alkoxy, N,N-di(lower alkyl) amino, nitro, cyano, halo, and lower alkyl carboxylic ester, wherein "lower" means $C_1$ to $C_4$;
"arylene or alkylene sulfonic acid group or salt thereof" means a group comprising at least one aromatic or hydrocarbon group substituted by at least one pendant sulfonic acid group or a salt thereof;
"cycloalkyl" and "cycloalkylene" groups mean the monovalent and divalent residues remaining after removal of one or two hydrogen atoms, respectively, from a cyclic hydrocarbon having 3 to 12 carbon atoms;
"electrophilic" refers to a compound, composition, or reagent that forms a bond to its reaction partner by accepting both bonding electrons from that reaction partner;
"group" or "compound" or "polymer" or "component" means a chemical species that allows for substitution or which may be substituted by conventional substituents which do not interfere with the desired product; e.g., substituents can be alkyl, alkoxy, aryl, phenyl, cyano, etc.;
"lower aliphatic lactone" means a lactone having 3 to 20 carbon atoms;
"lower alkyl group" means an alkyl group having 1 to 4 carbon atoms;
"molecular weight" means the sum of the atomic weights of all atoms in a group of atoms or in a segment of a polymer and under circumstances where the group or segment may be a mixture of two or more groups or segments is the number average of molecular weights of the groups or segments;
"nucleophilic" refers to a compound, composition, or reagent that forms a bond to its reaction partner by donating both bonding electrons to that reaction partner;
"polymer" includes oligomers;
"random polymer" means like groups can be located at various points along the polymer backbone and not similarly sequenced;
"silyl group" means $Si(Q)_p(OQ)_{3-p}$ where p=0, 1, or 2 wherein each Q independently can be hydrogen or a lower alkyl group having 1 to 4 carbon atoms such that an OQ group in which Q is a lower alkyl group is the hydrolyzable unit;
"sulfo group" or "sulfonate group" or "sulfonic acid group or salt thereof" means a —$SO_3M$ group where M can be H or a cation, preferably an alkali metal ion;
"sulfopolyol" means a symmetric or asymmetric compound or polymer or a random polymer comprising at least one sulfo group, at least two hydroxyl groups, optionally containing other functional groups such as ester, ether, urea, urethane, and thiocarbamate;
"sulfopolyester polyol" or "sulfoester polyol" means a symmetric or asymmetric polymer or a random polymer comprising at least one sulfo group, at least two ester groups, at least two hydroxyl groups, optionally containing other functional groups such as ester, ether, urea, urethane, and thiocarbamate;
"sulfopoly(ester-urethane)" means a symmetric or asymmetric polymer or a random polymer comprising at least one sulfo group, at least two ester groups and at least one urethane group, optionally containing other functional groups such as ether, carbonate, urea, and thiocarbamate; and
"triyl" group means a trivalent aryl or aliphatic group.

DETAILED DESCRIPTION

Figure 1:
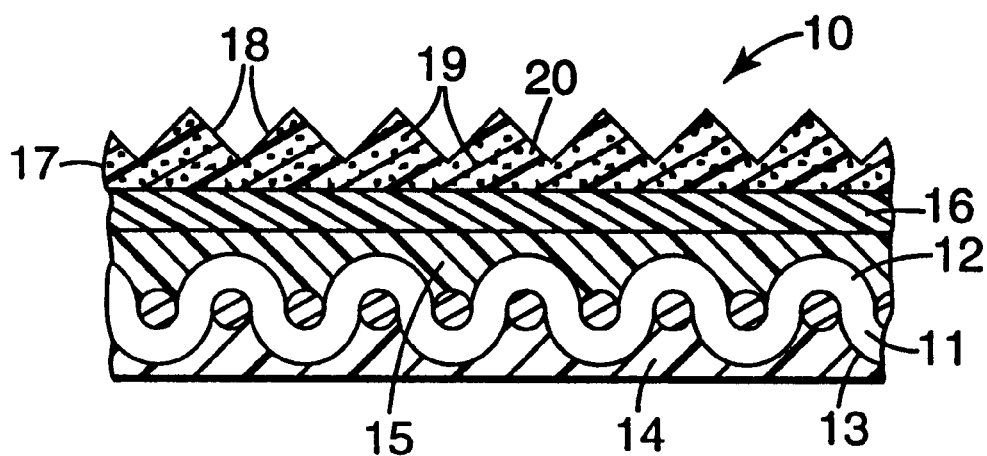
FIG. 1 is a cross-section of an abrasive article of the present invention.

The present invention provides an abrasive article having improved adhesion of an abrasive layer to a backing, preferably a cloth backing, and more preferably a treated cloth backing. A method for making an abrasive article in accordance with the present invention is preferably carried out as a continuous process, and is particularly advantageous at relatively high run speeds. Preferably, a backing is coated with a tie coat precursor and an abrasive slurry comprising abrasive particles dispersed in a binder precursor is then applied to this tie-coated backing. The tie coat precursor can be at least partially cured or, more preferably, substantially completely cured prior to the application of the abrasive slurry.

The tie coat is particularly advantageous when used on a conventionally treated cloth backing, although it can be used on an untreated cloth backing or other backings, such as paper, polymeric film, etc. It provides greater adhesion of the abrasive layer to the backing, particularly to conventionally treated cloth backings, and allows for faster processing times in a continuous manufacturing process.

Typically, slurry coated abrasive articles, such as structured abrasive articles as disclosed in U.S. Pat. Nos. 5,152, 917 (Pieper et al.) and 5,435,816 (Spurgeon et al.), are made using a continuous manufacturing process. They utilize radiation curable binder systems, such as acrylate-based binder precursors, in the abrasive slurry, that are typically cured with radiation energy during the continuous process. The speed at which this process is run, however, can be limited by the level of adhesion of the cured abrasive slurry (i.e., the abrasive layer) to the backing that can be obtained. Typically, speeds of less than 15.5 meters/minute are used to ensure adequate adhesion of the abrasive slurry to the backing. At speeds higher than this, however, adhesion of the abrasive slurry tends to diminish, which can be undesirable for certain applications.

As mentioned above, abrasive articles in accordance with the present invention are prepared from an abrasive slurry coated on a backing to provide a generally continuous layer of abrasive particles dispersed in a binder. This is referred to herein as a "coated abrasive article," and more specifically as a "slurry coated abrasive article." To enhance adhesion of the abrasive layer to the backing, a tie coat is disposed between the backing, optionally coated with one or more conventional treatment coat(s), and the abrasive layer. The abrasive layer may have a smooth, textured, embossed, structured, etc., surface.

One particularly preferred method of making such a slurry coated abrasive article includes placing the abrasive slurry into a mold to form a plurality of individual shaped abrasive precursor composites, which is then brought into contact with the backing, and subsequently at least partially cured to provide a shaped, handleable structure such that the tooling can be removed. The resultant product is referred to herein as a structured abrasive article comprising shaped abrasive composites. The individual shaped abrasive composites are three-dimensional with work surfaces that contact the workpiece during grinding.

It is preferred that these shaped abrasive composites be "precisely" shaped. This means that the shape of the composites is defined by relatively smooth surfaced sides that are bounded and joined by well-defined edges having distinct edge lengths with distinct endpoints defined by the intersections of the various sides. The terms "bounded" or "boundary" means the exposed surfaces and edges of each composite that delimit and define the actual three-dimensional shape of each abrasive composite. These boundaries are readily visible and discernible when a cross-section of an abrasive article is viewed under a scanning electron microscope. These boundaries separate and distinguish one abrasive composite from another even if the composites abut each other along a common border at their bases. By comparison, in an abrasive composite that does not have a precise shape, the boundaries and edges are not well defined, e.g., where the abrasive composite sags before completion of its curing. In some instances, it is preferred that these abrasive composites be arranged on the backing in a predetermined pattern or array.

Referring to FIG. 1, structured abrasive article 10 includes backing 11 having front surface 12 and back surface 13. The backing can further include optional backfill coat 14 that coats the backing, and optional presize coat 15 applied to the front surface 12 of the backing. To enhance adhesion of structured abrasive layer 17 to backing 11, tie coat 16 is disposed between backing 11 (optionally coated with either backfill coat 14, presize coat 15, or both) and structured abrasive layer 17. Structured abrasive layer 17 includes abrasive composites 18 comprising a plurality of abrasive particles 19 dispersed in binder 20.

Backing

The backing used in the abrasive articles of this invention has a front and back surface (i.e., a first and a second major surface) and can be any suitable material typically used for conventional abrasive backings. Examples of such materials include primed and unprimed polymeric film, cloth, paper, vulcanized fibre, nonwoven webs, and combinations thereof. The backing may also contain a treatment or treatments to seal the backing and/or modify the physical properties of the backing. These treatments are well known in the art, and are discussed in greater detail below.

The preferred backing of the invention is a cloth backing. The cloth is composed of yarns in the warp direction, i.e., the machine direction and yarns in the fill direction, i.e., the cross direction. The cloth backing can be a woven backing, a stitchbonded backing, or a weft insertion backing. Examples of woven constructions include sateen weaves of four over one weave of the warp yarns over the fill yarns; twill weaves of three over one weave; plain weaves of one over one weave; and drill weaves of two over one weave. In a stitchbonded fabric or weft insertion backing, the warp and fill yarns are not interwoven, but are oriented in two distinct directions from one another. The warp yarns are laid on top of the fill yarns and secured to another by a stitch yarn or by an adhesive.

The yarns in the cloth backing can be natural, synthetic, or combinations thereof. The yarns can be twisted or texturized. Examples of natural yarns include cellulosics such as cotton, hemp, kapok, flax, sisal, jute, manila and combinations thereof. Examples of synthetic yarns include polyester yarns, polypropylene yarns, glass yarns, polyvinyl alcohol yarns, polyimide yarns, aromatic polyarnide yarns, regenerated cellulose yarns such as rayon yarns, nylon yarns, polyethylene yarns, and combinations thereof. The preferred yarns of this invention are polyester yarns, nylon yarns, a mixture of polyester and cotton, cellulosic yarns, and aromatic polyarnide yarns.

Polyester yarns are formed from a long chain polymer made from the reaction of an ester of dihydric alcohol and terephthalic acid. Preferably, this polymer is a linear polymer of poly(ethylene terephthalate). There are three main types of polyester yarns: ring spun; open end; and filament. A ring spun yarn is made by continuously drafting a polyester yarn, twisting the yarn and winding the yarn on a bobbin. An open end yarn is made directly from a sliver or roving. A series of polyester rovings are opened and then all of the rovings are continuously brought together in a spinning apparatus to form a continuous yarn. A filament yarn is a long continuous fiber; a filament yarn typically has a very low or non-existent twist to the polyester fiber.

The denier of the fibers should be less than about 2000, preferably about 100–1500. The yarn size should be within a range of about 1500–12,000 meters/kilogram. For a coated abrasive cloth backing, the weight of the greige cloth, i.e., the untreated cloth or raw cloth, will be within a range of about 0.1–1 kg/m$^2$, preferably within a range of about 0.1–0.75 kg/m$^2$. Untreated "J" weight cloth typically has a weight of about 130–195 g/m$^2$, "X" weight cloth typically has a weight of about 200–245 g/m$^2$, and "Y" weight cloth typically has a weight of about 270–330 g/m$^2$. The cloth backing should also have a high surface area.

Coated abrasive cloth backings can be dyed, stretched, desized, or heat set. Additionally, the yarns in the cloth backing can contain primers, dyes, pigments, or wetting agents. The cloth backings can also have a variety of treatment coats, such as a saturant coat, presize coat, backsize coat, subsize coat, backfill coat, frontfill coat, and the like. As used herein, a "treated" cloth backing refers to a cloth backing that has at least one such treatment coat. This does not include cloth that has been desized or heat set because they do not typically contain a residual coating thereon.

Preferably, the cloth backing includes at least one of these treatment coats. The purpose of these treatment coats is to seal the backing and/or protect the yarns or fibers in the backing, reduce stretch, improve heat resistance, improve moisture resistance, tailor flexibility, and/or improve adhesion. The addition of one or more of these treatment coats may additionally result in a "smoother" surface on either the front or back side of the backing.

After any one of the treatment coats is applied to the cloth backing, the resultant treated cloth backing can be heat treated or calendered. The heat treatment can be carried out in a tenter frame which is in an oven. Additionally the backing can be processed through heated hot cans. The calendering step will remove surface roughness and typically increase the surface smoothness.

Conventional cloth treatments, whether they be applied as saturant coats, presize coats, backsize coats, backfill coats, frontfill coats, etc., include various starches, gums, dextrins, animal glues, urea-formaldehyde resins, poly(vinyl alcohol) and poly(vinyl acetate) resins and latices, ethyl cellulose, nitrile latices, styrene/butadiene latices, vinyl and rubber latices, epoxies, phenolic resins, acrylate resins, acrylic latices, urethane resins, vinyl ether-functional resins, and combinations thereof. Preferred cloth treatments for use with the radiation curable materials used in the binder precursor of the present invention include poly(vinyl acetate) latices, nitrile latices, stryene/butadiene latices, acrylic latices, phenolic resins, and combinations thereof. Particularly preferred cloth treatments for use with the radiation curable materials used in the binder precursor of the present invention include acrylic latices, phenolic resins, and combinations thereof.

Suitable acrylic latices are those forming films having the following physical properties: glass transition temperatures of about −50° C. to about +40° C., preferably about −5° C. to about +35° C.; tensile strength of at greater than about 1.38 MPa, preferably greater than about 6.89 MPa; and elongation of greater than about 10%, preferably less than about 5000%, and more preferably about 250–1000%. Such acrylic latices are commercially available from B.F. Goodrich Co., Cleveland, Ohio, AtoHaas North America, Inc., Bristol, Pa., Air Products and Chemicals, Inc., Reichhold Chemical Co. Suitable phenolic resins are water miscible and form continuous homogenous films with the selected acrylic latex. Such phenolic resins are commercially available from Occidental Chemical Corp., Dallas, Tex., Georgia Pacific Resins, Inc., Columbus, Ohio, Ashland Chemical Co., Columbus, Ohio, Monsanto, St. Louis, Mo., and Bakelite, Letmathe, Germany.

Binder Precursor

A binder system used in the abrasive layer in the abrasive articles of the invention is formed from a binder precursor. Preferably, a suitable binder precursor comprises a resinous adhesive in an uncured and flowable state that is capable of solidifying. The solidification can be achieved by curing (i.e., polymerizing and/or crosslinking) or by drying (e.g., or driving off a liquid) and curing. The binder precursor can be organic solvent-borne, water-borne, or 100% solids (i.e., a substantially solvent-free) compositions. That is, the binder may be formed from a 100% solids formulation or they may be coated out of a solvent (e.g., a ketone, tetrahydrofuran, or water) with subsequent drying and curing. If a solvent is used, it is one that does not react with the other components of the precursors, but can be driven off by heat, for example, although complete elimination is not necessarily required. Preferably, the binder precursor are 100% solids formulations that are substantially solvent-free (i.e., contain less than about 1 weight % solvent).

The binder precursor is capable of irreversibly forming a cured oligomeric/polymeric material and are often referred to as "thermosetting" precursors. The term "thermosetting" precursor is used herein to refer to reactive systems that irreversibly cure upon the application of heat and/or other sources of energy, such as E-beam, ultraviolet, visible, etc., or with time upon the addition of a chemical catalyst, moisture, or the like. The term "reactive" means that the components of the binder and tie coat precursors react with each other (or self react) either by polymerizing, crosslinking, or both. These components are often referred to as resins. As used herein, the term "resin" refers to polydisperse systems containing monomers, oligomers, polymers, or combinations thereof.

Materials suitable for forming the abrasive binder are precursors comprising reactive components (i.e., components capable of being crosslinked and/or polymerized) that are curable using radiation. These are referred to herein as radiation curable materials. As used herein, "radiation curable" refers to curing mechanisms that involve polymerization and/or crosslinking of resin systems upon exposure to ultraviolet radiation, visible radiation, electron beam radiation, or combinations thereof, optionally with the appropriate catalyst or initiator. Typically, there are two types of radiation cure mechanisms that occur—free radical curing and cationic curing. These usually involve one stage curing or one type of curing mechanism. Suitable materials for use in the abrasive articles of the present invention are free radical curable materials; however, mixtures of free radical and cationic materials may also be cured to impart desired properties from both systems. Also possible are dual-cure and hybrid-cure systems, as discussed below, as long as the system includes a material capable of radiation curing.

In cationic systems, cationic photoinitiators react upon exposure to ultraviolet/visible light to decompose to yield an acid catalyst (e.g., a protonic acid or Lewis acid). The acid catalyst propagates a crosslinking reaction via an ionic mechanism. Epoxies, particularly cycloaliphatic epoxies, are the most common resins used in cationic curing, although aromatic epoxies and vinyl ether based oligomers can also be used. Furthermore, polyols can be used in cationic curing with epoxies as chain-transfer agents and flexibilizers. Also, epoxysiloxanes as disclosed in Eckberg et al., "UV Cure of Epoxysiloxanes," *Radiation Curing in Polymer Science and Technology: Volume IV, Practical Aspects and Applications*, Fouassier and Rabek, eds., Elsevier Applied Science, NY, Chapter 2, 19–49 (1993) can be cured using a cationic photoinitiator. The cationic photoinitiators include salts of onium cations, such as arylsulfonium salts, as well as organometallic salts such as iron arene systems. Examples of cationic photoinitiators are disclosed in U.S. Pat. No. 4,751,138 (Tumey et al.) and U.S. Pat. No. 4,985,340 (Palazzotto), and European Patent Application Nos. 306,161 and 306,162.

In free radical systems, radiation provides very fast and controlled generation of highly reactive species that initiate polymerization of unsaturated materials. Examples of free radical curable materials include, but are not limited to, acrylate resins, aminoplast derivatives having pendant alpha,beta-unsaturated carbonyl groups, isocyanurate derivatives having at least one pendant acrylate group, isocyanate derivatives having at least one pendant acrylate group, unsaturated polyesters (e.g., the condensation products of organic diacids and glycols), and other ethylenically unsaturated compounds, and mixtures or combinations thereof. These free radical curable systems can be cured using radiation energy, although they can be cured using thermal energy, as long as there is a source of free radicals in the system (e.g., peroxide or azo compounds). Thus, the phrase "radiation curable," and more particularly the phrase "free radical curable," include within their scope systems that also can be cured using thermal energy and that involve a free radical curing mechanism. In contrast, the phrase "radiation cured" refers to systems that have been cured by exposure to radiation energy.

Suitable acrylate resins for use in the present invention include, but are not limited to, monofunctional and multifunctional acrylate monomers, as well as acrylated urethanes (i.e., urethane acrylates), acrylated epoxies (i.e., epoxy acrylates), acrylated polyesters (i.e., polyester acrylates), acrylated acrylics, and acrylated polyethers (i.e., polyether acrylates). As used herein, the terms "acrylate" and "acrylate-functional" compound includes both acrylates and methacrylates, whether they be monomers, oligomers, or polymers.

Examples of suitable monofunctional acrylate monomers include, but are not limited to, ethyl acrylate, ethyl methacrylate, methyl acrylate, methyl methacrylate, isooctyl acrylate, oxethylated phenol acrylate, isobornyl acrylate, 2-ethylhexyl acrylate, vinyl pyrrolidone, 2-phenoxyethyl acrylate, 2-(ethoxyethoxy)ethyl acrylate, ethylene glycol methacrylate, tetrahydroxy furfuryl acrylate (THF acrylate), caprolactone acrylate, and methoxy tripropylene glycol monoacrylate. Examples of suitable multifunctional acrylate monomers include, but are not limited to, triethylene glycol diacrylate, pentaerythritol triacrylate, trimethylolpropane triacrylate, pentaerythritol trimethacrylate, glycerol triacrylate, trimethylolpropane trimethacrylate, trimethylolpropane triacrylate, 1,6-hexanediol diacrylate, 1,4-butanediol diacrylate, tetramethylene glycol diacrylate, tripropylene glycol diacrylate, ethylene glycol diacrylate, ethylene glycol dimethacrylate, polyethylene glycol diacrylate, pentaerythritol tetraacrylate, pentaerythritol tetramethacrylate, and 1,6-hexane diacrylate. Such compounds are available under the trade designations EBECRYL from UCB Radcure Inc., Smyrna, Ga., PHOTOMER from Henkel Corp., Hoboken, N.J., and SARTOMER from Sartomer Co., West Chester, Pa. Preferably, the precursor compositions include a multifunctional acrylate monomer.

Acrylated urethanes are diacrylate esters of hydroxy terminated isocyanate extended polyesters or polyethers. They can be aliphatic or aromatic, although acrylated aliphatic urethanes are preferred because they are less susceptible to weathering. Examples of commercially available acrylated urethanes include those known by the trade designations PHOTOMER (e.g., PHOTOMER 6010) from Henkel Corp., Hoboken, N.J.; EBECRYL 220 (hexafunctional aromatic urethane acrylate of molecular weight 1000), EBECRYL 284 (aliphatic urethane diacrylate of 1200 molecular weight diluted with 1,6-hexanediol diacrylate), EBECRYL 4827 (aromatic urethane diacrylate of 1600 molecular weight), EBECRYL 4830 (aliphatic urethane diacrylate of 1200 molecular weight diluted with tetraethylene glycol diacrylate), EBECRYL 6602 (trifunctional aromatic urethane acrylate of 1300 molecular weight diluted with trimethylolpropane ethoxy triacrylate), and EBECRYL 8402 (aliphatic urethane diacrylate of 1000 molecular weight) from UCB Radcure Inc., Smyrna, Ga.; SARTOMER (e.g., SARTOMER 9635, 9645, 9655, 963-B80, 966-A80, etc.) from Sartomer Co., West Chester, Pa.; and UVITHANE (e.g., UVITHANE 782) from Morton International, Chicago, Ill.

Acrylated epoxies are diacrylate esters of epoxy resins, such as the diacrylate esters of bisphenol A epoxy resin. Examples of commercially available acrylated epoxies include those known by the trade designations EBECRYL 600 (bisphenol A epoxy diacrylate of 525 molecular weight), EBECRYL 629 (epoxy novolac acrylate of 550 molecular weight), and EBECRYL 860 (epoxidized soya oil acrylate of 1200 molecular weight) from UCB Radcure Inc., Smyrna, Ga.; and PHOTOMER 3016 (bisphenol A epoxy diacrylate), PHOTOMER 3038 (epoxy acrylate/tripropylene glycol diacrylate blend), PHOTOMER 3071 (modified bisphenol A acrylate), etc. from Henkel Corp., Hoboken, N.J.

Acrylated polyesters are the reaction products of acrylic acid with a dibasic acid/aliphatic/diol-based polyester. Examples of commercially available acrylated polyesters include those known by the trade designations PHOTOMER 5007 (hexafunctional acrylate of 2000 molecular weight), PHOTOMER 5018 (tetrafunctional acrylate of 1000 molecular weight), and other acrylated polyesters in the PHOTOMER 5000 series from Henkel Corp., Hoboken, N.J.; and EBECRYL 80 (tetrafunctional modified polyester acrylate of 1000 molecular weight), EBECRYL 450 (fatty acid modified polyester hexaacrylate), and EBECRYL 830 (hexafunctional polyester acrylate of 1500 molecular weight) from UCB Radcure Inc., Smyrna, Ga.

Acrylated acrylics are acrylic oligomers or polymers that have reactive pendant or terminal acrylic acid groups capable of forming free radicals for subsequent reaction. Examples of commercially available acrylated acrylics include those known by the trade designations EBECRYL 745, 754, 767, 1701, and 1755 from UCB Radcure Inc., Smyrna, Ga.

Isocyanurate derivatives having at least one pendant acrylate group and isocyanate derivatives having at least one pendant acrylate group are further described in U.S. Pat. No. 4,652,274 (Boetcher et al.). Preferred binder precursors of the present invention include an isocyanurate derivative having at least one pendant acrylate group. The preferred isocyanurate is a triacrylate of tris(hydroxy ethyl) isocyanurate.

The aminoplast resins have at least one pendant alpha, beta-unsaturated carbonyl group per molecule or oligomer. These unsaturated carbonyl groups can be acrylate, methacrylate, or acrylamide type groups. Examples of resins with acrylamide groups include N-(hydroxymethyl)-acrylamide, N,N'-oxydimethylenebisacrylamide, ortho- and para-acrylamidomethylated phenol, acrylamidomethylated phenolic novolac, glycoluril acrylamide, acrylamidomethylated phenol, and combinations thereof. These materials are further described in U.S. Pat. Nos. 4,903,440 (Larson et al.), 5,055,113 (Larson et al.), and 5,236,472 (Kirk et al.).

Other suitable ethylenically unsaturated resins include monomeric, oligomeric, and polymeric compounds, typically containing ester groups, acrylate groups, and amide groups. Such ethylenically unsaturated compounds preferably have a molecular weight of less than about 4,000. They are preferably esters made from the reaction of compounds containing aliphatic monohydroxy groups or aliphatic polyhydroxy groups and unsaturated carboxylic acids, such as acrylic acid, methacrylic acid, itaconic acid, maleic acid, and the like. Representative examples of acrylates are listed above. Other ethylenically unsaturated resins include monoallyl, polyallyl, and polymethallyl esters and amides of carboxylic acids, such as diallyl phthalate, diallyl adipate, N,N-diallyladipamide, styrene, divinylbenzene, vinyl toluene. Still others include tris(2-acryloyl-oxyethyl)-isocyanurate, 1,3,5-tri( 2-methyacryloxyethyl)-s-triazine, acrylamide, methylacrylamide, N-methylacrylamide, N,N-dimethylacrylamide, N-vinylpyrrolidone, and N-vinylpiperidone.

In dual-cure resin systems, the polymerization or crosslinking occur in two separate stages, via either the same or different reaction mechanisms. In hybrid-cure resin systems, two mechanisms of polymerization or crosslinking occur at the same time on exposure to ultraviolet/visible or E-beam radiation. The chemical curing mechanisms that can occur in these systems include, but are not limited to, radical polymerization of acrylic double bonds, radical polymerization of unsaturated polyesters of styrene or other monomers, and cationic curing of vinyl ethers or epoxies. Thus, the dual-cure and hybrid-cure systems can combine radiation curing with thermal curing, or radiation curing with moisture curing, for example. A combination of E-beam curing with ultraviolet/visible curing is also possible. Combining curing mechanisms can be accomplished, for example, by mixing materials with two types of functionality on one structure or by mixing different materials having one type of functionality. Such systems are discussed in Peeters, "Overview of Dual-Cure and Hybrid-Cure Systems in Radiation Curing," *Radiation Curing in Polymer Science and Technology: Volume III Polymer Mechanisms*, Fouassier and Rabek, eds., Elsevier Applied Science, NY, Chapter 6, 177–217 (1993).

Of the radiation curable materials, the acrylates are particularly preferred for use in the binder precursor of the present invention. Examples of such materials include, but are not limited to, mono- or multi-functional acrylates (i.e., acrylates and methacrylates), acrylated epoxies, acrylated polyesters, acrylated aromatic or aliphatic urethanes, acrylated acrylics, acrylated silicones, etc., and combinations or blends thereof. These can be monomers or oligomers (i.e., moderately low molecular weight polymers typically containing 2–100 monomer units, and often 2–20 monomer units) of varying molecular weight (e.g., 100–2000 weight average molecular weight).

A photoinitiator is typically included in ultraviolet/visible curable precursors of the present invention. Illustrative examples of photopolymerization initiators (i.e., photoinitiators) include, but are not limited to, organic peroxides, azo compounds, quinones, benzophenones, nitroso compounds, acryl halides, hydrozones, mercapto compounds, pyrylium compounds, triacrylimidazoles, bisimidazoles, chloroalkytriazines, benzoin ethers, benzil ketals, thioxanthones, and acetophenone derivatives, and mixtures thereof. Specific examples include benzil, methyl o-benzoate, benzoin, benzoin ethyl ether, benzoin isopropyl ether, benzoin isobutyl ether, benzophenone/tertiary amine, acetophenones such as 2,2-diethoxyacetophenone, benzyl methyl ketal, 1-hydroxycyclohexylphenyl ketone, 2-hydroxy-2-methyl-1-phenylpropan-1-one, 1-(4-isopropylphenyl)-2-hydroxy-2-methylpropan-1-one, 2-benzyl-2-N,N-dimethylamino-1-(4-morpholinophenyl)-1-butanone, 2,4,6-trimethylbenzoyl-diphenylphosphine oxide, 2-methyl-1-4(methylthio), phenyl-2-morpholino-1-propanone, bis(2,6-dimethoxybenzoyl)(2,4,4-trimethylpentyl)phosphine oxide, etc. Such photoinitiators include those available under the trade designations DAROCUR 4265 (50:50 blend of 2-hydroxy-2-methyl-1-phenylpropan-1-one and 2,4,6-trimethylbenzoyldiphenylphosphine oxide) and CGI1700 (25:75 blend of bis(2,6-dimethoxybenzoyl)-2,4,4-trimethylpentylphosphine and 2-hydroxy-2-methyl-1-phenylpropan-1-one) available from Ciba-Geigy Corp., Ardsley, N.Y. The tie coat precursor and binder precursor include a sufficient amount of photoinitiator to provide the line speeds discussed above. Typically, this is within a range of about 0.01–5 wt-%, based on the total composition of the precursor.

Tie Coat Precursors

Preferably, a suitable tie coat precursor includes a composition comprising a sulfopoly(ester-urethane) component comprising in its backbone at least one non-terminal arylene or alkylene group comprising a pendant sulfonic acid group or salt thereof having the formula:

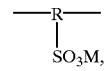

wherein R is a trivalent aliphatic or aromatic group and M is a cation, said aliphatic or aromatic group being bonded directly to ester groups and wherein the polymer is terminated by at least one hydrolyzable silyl group. More preferably, the sulfopoly(ester-urethane) component has the following structural formula:

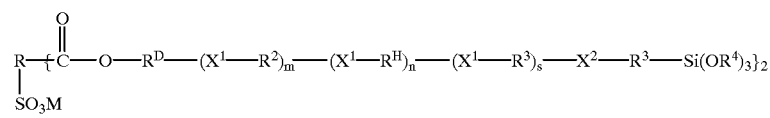

wherein
R can be a $C_6$–$C_{12}$ aryltriyl or $C_1$–$C_{20}$ aliphatic triyl group(trivalent aryl or aliphatic group) in which M is a cation, preferably M is Na, but M can be H, an alkali metal such as K, Li, an alkaline earth metal cation (e.g., Mg, Ca, or Ba), or a primary, secondary, tertiary, or quaternary ammonium cation such as ammonium, methylammonium, butylammonium, diethylammonium, triethylammonium, tetraethylammonium, and benzyltrimethylammonium cation; preferably when R is aliphatic it is an alkylene group;

can be, for example, but not limited to:

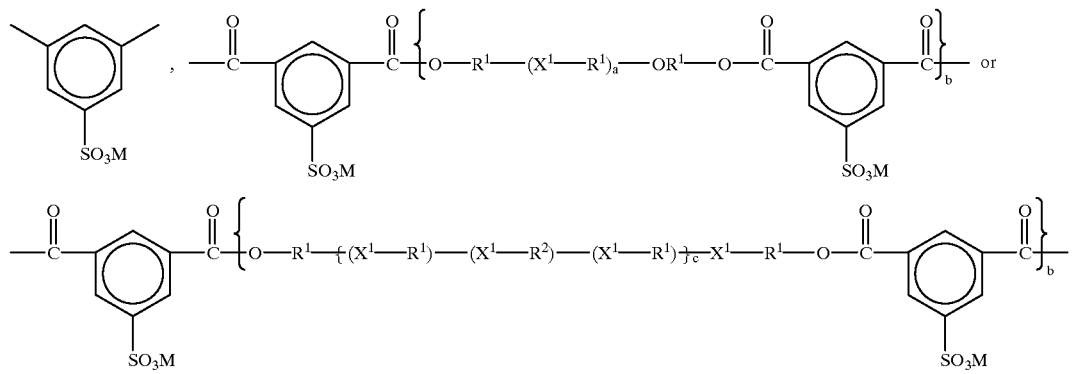

wherein $R^1$, $R^2$, $R^D$, $R^H$, $R^3$, $R^4$, and $R^5$ are defined below, except additionally, $R^1$ may also comprise an oligomeric segment, such as, for example, a polyester or a polylactone segment, m=0 or 1, n=0 or 1, s=0 or 1, with the proviso that independently, one of m or n must be equal to 1, a can be a number 1 to 10, b can be a number 1 to 4, c can be a number 1 to 15.

The skilled artisan will recognize that the values for a, b, and c can vary over a broad range, depending on the molecular weight of the $R^1$ and $R^2$ segments. The important factor in determining the value of these variables is the sulfonate equivalent weight of the final poly(ester-urethane) molecule, which should fall in the range of 500 to 12,000 g/eq. Generally speaking, the values of a and c will be larger when lower molecular weight $R^1$ (and $R^2$) segments are utilized and they will be smaller when oligomeric $R^1$ segments are utilized. $R^D$ can be 1) at least one of a divalent linear or branched organic group of 20 to about 150 carbon atoms in units of 2 to 12 methylene groups and arylene groups of 6 to 10 carbon atoms separated by at least one of 1 to 50 catenary oxygen atoms and by 1 to 30 oxycarbonyl groups,

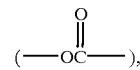

preferably at least one of 1 to 20 catenary oxygen atoms and by 1 to 10 oxycarbonyl groups, the organic group having a molecular weight of 400 to 2,500; or $R^D$ can be 2) an organic group selected from the group consisting of a linear or branched alkylene group having 2 to 12 carbon atoms, a cyclopentamethylene group, a cyclohexamethylene group, a 5- or 6-membered azacyclic group, a phenylene group, a naphthalene group, a phenylenemethylenephenylene group, the organic group optionally being substituted by up to four lower alkyl groups having 1 to 4 carbon atoms and a total of up to 15 carbon atoms, which organic group can be chain extended by a transesterification reaction between a diol terminated ester precursor and a lower aliphatic diester of an aliphatic diacid having from 2 to 12 carbons or an aromatic diacid having from 8 to 12 carbons or reaction between a diol terminated ester precursor and an aliphatic lactone of 3 to 20 carbons; or $R^D$ can have 3) the structure $\{-R^1-(X^1-R^2-X^1-R^1)_p-\}$ where p is an integer from 1 to 5, produced by the reaction of a polyol with an isocyanate having the structure $OCN-R^2-NCO$ to produce a segment having a molecular weight of from 500 to 4,000, preferably 800 to 2,000;

$R^1$ can be a linear or branched alkylene group having 2 to 12 carbon atoms, or an arylene group having 6 to 10 carbon atoms;

$X^1$ can be

$R^2$ can be an organic group preferably selected from the group consisting of a linear or branched alkylene group having 2 to 12 carbon atoms, a cyclopentamethylene group, a cyclohexamethylene group, a 5- or 6-membered azacyclic group, a phenylene group, a naphthalene group, a phenylenemethylenephenylene group, or a group such as the residue remaining after removal of the isocyanate groups from polyisocyanates such as hexamethylene diisocyanate, bis(4- isocyanatocyclohexyl)methane, 1,3-bis (isocyanatomethyl)cyclohexane, isophorone diisocyanate,1,3-bis(1-isocyanato-1-methylethyl) benzene, and 4,4'-diphenylmethane diisocyanate (also known as MDI), or the residue remaining after removal of the isocyanate groups from isocyanates such as those described in U.S. Pat. Nos. 3,700,643 and 3,600,359, which are incorporated herein by reference, or the residue remaining after removal of the isocyanate groups from isocyanates such as those produced by trimerization reactions of diisocyanates, for example, hexamethylenediisocyanate, wherein the organic group optionally being substituted by up to four lower alkyl groups having 1 to 4 carbon atoms and a total of at most 15 carbon atoms;

$X^2$ can be

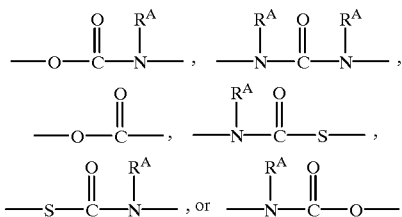

wherein $R^A$ can be hydrogen or lower alkyl having 1 to 4 carbon atoms;

$R^H$ can be a divalent hydrophobic group selected from divalent oligomeric siloxanes having the structure

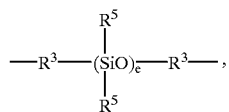

divalent organic groups having the structure

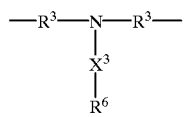

comprising a pendant alkyl group;

or divalent organic groups having one of the structures

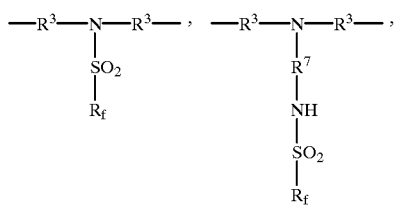

or quaternary salts thereof, wherein $R_f$ can be a fluorocarbon pendant group, as defined below; and $R^3$ can be a divalent organic group, preferably linear or branched alkylene group having 2 to 12 carbon atoms, but it can also be an arylene, such as phenylene or an alkarylene group, each having 6 to 20 carbon atoms;

$R^4$ can be a monovalent lower alkyl group having from 1 to 4 carbon atoms;

$R^5$ can be a monovalent group selected from the group consisting of alkyl groups of one to about twelve carbon atoms, aryl having 6 to 10 carbon atoms, or aralkyl groups having 6 to 10 carbon atoms, with at least 70% of $R^5$ being methyl;

e can be an integer of from about 10 to about 300;

$X^3$ can be a covalent bond, a carbonyl group,

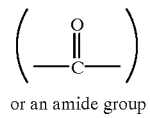

or an amide group

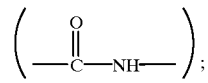

$R^6$ can be a monovalent group selected from the group consisting of alkyl groups of about 4 to about 60 carbon atoms, preferably 12 to 30 carbon atoms;

$R^7$ can be a divalent group selected from the group consisting of alkylene groups of 2 to about 12 carbon atoms; and $R_f$ can be a monovalent saturated fluoroaliphatic group having 6 to 12 carbon atoms, at least four of which are fully-fluorinated carbon atoms.

It is also understood that when the group $R^D$ (or its component groups $R^1$ and $R^2$) or the group $R^2$ contains branched alkylene components that these components constitute additional termini of the polymer or oligomer and as such, may themselves be terminated by at least one hydrolyzable silyl group.

A tie coat precursor preferably contains a sulfopoly(ester-urethane) component terminated by at least one hydrolyzable silyl group and having a sulfonate equivalent weight of about 500 to 12,000 g per equivalent, preferably 2,000 to 10,000 g per equivalent. A sulfopoly(ester-urethane) component also preferably has a number average molecular weight 2,000 up to less than 50,000, preferably in the range of 2,000 to 20,000, more preferably 5,000 to 8,000.

Suitable sulfopoly(ester-urethane) components terminated by at least one hydrolyzable silyl group can be made in accordance with the methods in U.S. Pat. Nos. 5,756,633 (Larson et al.), 5,747,626 (Krepski et al.) and 5,929,160 (Krepski et al.). In particular, a sulfopoly(ester-urethane) component terminated by at least one hydrolyzable silyl group is prepared from a sulfopolyester polyol. A suitable sulfopolyester polyol is preferably prepared by a two-step, chain extension method which typically includes the steps of:

a) reacting a sulfopolycarboxylic acid or ester with a polyol to produce a sulfopolyester polyol, b) chain extending said sulfopolyester polyol by an esterification reaction with a lower aliphatic lactone to produce a chain extended sulfopolyester polyol, and the chain extended sulfopolyester polyol then, (1) in one embodiment, being reacted with a stoichiometric excess of a polyisocyanate and at least one of a polyol, polyarnine, and polythiol to produce an isocyanate-terminated sulfo (polyester-urethane), which is then reacted with a nucleophilic, hydrolyzable silane, or (2) in a second embodiment being reacted with a polyisocyanate and a stoichiometric excess of at least one of a polyol, polyarnine, and polythiol to produce a hydroxyl-, amino-, or mercapto-terminated sulfo(polyester-urethane) which is then reacted with an electrophilic hydrolyzable silane to produce a sulfopoly(ester-urethane) component terminated by at least one hydrolyzable silyl group.

Preferably, a tie coat precursor is in an uncured and flowable state that is capable of solidifying. The solidification can be achieved by curing, preferably by drying (e.g., or driving off a liquid) such that the tie coat precursor sufficiently crosslinks to form a tie coat. The tie coat precursor may include an organic solvent, water, or a combination thereof. Preferably, the tie coat is formed from a tie coat precursor comprising a sulfopoly(ester-urethane) component, as defined above, and water by driving off the water by application of heat, for example, although complete elimination is not necessarily required. Preferably, the tie coat precursors contain up to about 80%, preferably up to about 70%, and more preferably about 20% to about 70% solids dispersed in water. That is, the tie coat precursor is preferably an aqueous dispersion containing up to about 80% solids, for example. The tie coat precursor is capable of irreversibly forming a cured oligomeric/polymeric material and is often referred to as "thermosetting," as defined above.

Abrasive Particles

Preferably, abrasive particles typically have a particle size in a range of about 0.1–1500 micrometers, and preferably about 0.1–400 micrometers. It is preferred that the abrasive particles have a MOH's hardness of at least about 8, more preferably at least about 9. Examples of such abrasive particles include, but are not limited to, fused aluminum oxide which includes brown aluminum oxide, heat treated aluminum oxide and white aluminum oxide, green silicon carbide, silicon carbide, chromia, alumina zirconia, diamond, iron oxide, ceria, cubic boron nitride, garnet, sol-gel abrasive particles, and combinations thereof.

The term abrasive particles also encompasses agglomerates wherein single abrasive particles are bonded together. Abrasive agglomerates are further described in U.S. Pat. Nos. 4,311,489 (Kressner), 4,652,275 (Bloecher et al.), and 4,799,939 (Bloecher et al.), the disclosures of which are incorporated herein by reference.

Abrasive particles used in the abrasive articles and/or made according to the present invention can also include a surface coating. Surface coatings are known to improve the adhesion between the abrasive particles and the binder in abrasive articles. They may also improve the abrading properties of the articles. Such surface coatings are, for example, described in U.S. Pat. Nos. 5,011,508 (Wald et al.), 5,009,675 (Kunz et al.), 4,997,461 (Markhoff-Matheny et al.), 5,213,951 (Celikkaya et al.), 5,085,671 (Martin et al.), and 5,042,991 (Kunz et al.), the disclosures of which are incorporated by reference.

Additionally, the abrasive articles may contain a blend of the abrasive particles with diluent particles. These diluent particles can be selected from the group consisting of: (1) an inorganic particle (nonabrasive inorganic particle); (2) an organic particle; (3) a composite diluent particle containing a mixture of inorganic particles and a binder; (4) a composite diluent particle containing a mixture of organic particles and a binder. The nonabrasive inorganic particles typically include materials having a Moh's hardness of less than about 6. The nonabrasive inorganic particles can include grinding aids, fillers, and the like, which are described below. The particle size of these diluent particles can be within a range of about 0.01–1500 micrometers, typically about 1–1000 micrometers. The diluent particles may have the same particle size and particle size distribution as the abrasive particles, or they may be different.

Optional Additives in the Binder Precursor and/or the Tie Coat Precursor

The binder precursor and/or tie coat precursor can further include an optional additive that can be selected from the group of fillers, fibers, wetting agents, thixotropic materials, surfactants, pigments, dyes, antistatic agents, coupling agents, plasticizers, suspending agents, and the like. The amounts of these materials are selected to provide the desired properties. The use of these can affect the erodability of the abrasive composite. In some instances, an additive is purposely added to make the abrasive composite more erodable, thereby expelling dulled abrasive particles and exposing new abrasive particles.

Fillers and grinding aids may be particulate materials. Examples of particulate materials that act as fillers include metal carbonates, silica, silicates, metal sulfates, metal oxides, and the like. Examples of materials that act as grinding aids include: halide salts such as sodium chloride, potassium chloride, sodium cryolite, and potassium tetrafluoroborate; metals such as tin, lead, bismuth, cobalt, antimony, iron, and titanium; organic halides such as polyvinyl chloride and tetrachloronaphthalene; sulfur and sulfur compounds; graphite; and the like. A grinding aid is a material that has a significant effect on the chemical and physical processes of abrading, which results in improved performance. In particular, it is believed in the art that the grinding aid will: (1) decrease the friction between the abrasive particles and the workpiece being abraded; (2) prevent the abrasive particle from "capping," (i.e., prevent metal particles from becoming welded to the tops of the abrasive particles; (3) decrease the interface temperature between the abrasive particles and the workpiece; or (4) decrease the grinding forces. In a coated abrasive article with a make, size, and supersize coat, a grinding aid is typically used in the size or supersize coat applied over the surface of the abrasive particles. Typically, if desired, a grinding aid is used in an amount of about 5–300 g/m$^2$ of abrasive article.

Examples of antistatic agents include graphite, carbon black, vanadium oxide, humectants and the like. These antistatic agents are disclosed in U.S. Pat. Nos. 5,061,294 (Harmer et al.), 5,137,542 (Buchanan et al.), and 5,203,884 (Buchanan et al.), the disclosures of which are incorporated herein after by reference.

A coupling agent can provide an association bridge between the binder precursor and the filler particles or abrasive particles. Examples of coupling agents include silanes, titanates, and zircoaluminates. The abrasive slurry preferably includes about 0.01–3% by weight coupling agent. There are various means to incorporate the coupling agent. For example, the coupling agent may be added directly to the binder precursor. Alternatively, the coupling agent may be applied to the surface of the filler particles. In still another means, the coupling agent is applied to the surface of the abrasive particles prior to being incorporated into the abrasive article.

Methods of Making the Abrasive Articles

The abrasive articles of the invention are prepared by coating the backing with the tie coat precursor at a wet coating weight of about 20–200 g/m$^2$, preferably about 20–90 g/m$^2$, and more preferably about 60–85 g/m$^2$. However, one with skill in the art will recognize that the wet coating weight can be as low as possible but should be enough to form a substantially continuous film on the backing surface, which depends upon the roughness of the backing material used, for example. The tie coat precursor can be applied by a variety of methods, such as knife coating, die coating, gravure coating, squeeze roll coating, spray coating, curtain coating, and other methods that can uniformly apply at least a monomolecular layer to the substrate. The abrasive slurry can then be applied to this tie coated-backing by a variety of methods, such as roll coating, gravure coating, knife coating, spray coating, transfer coating, vacuum die coating, die coating, and the like, or the tie-coated backing can be brought into contact with the abrasive slurry in a mold having the inverse of the desired topography.

Preferably, the tie coat precursor is at least partially cured and, more preferably, substantially completely cured prior to application of the abrasive slurry. The term "partial cure" means that the resin is polymerized and/or crosslinked to such a state that the precursor does not flow from an inverted test tube. The term "substantially completely cured" means that the precursor is dry, e.g., non-tacky, to the touch. For structured abrasive articles, partial cure of the resin at the interface between the resin and the tooling is important to allow removal of the tooling. Partial or substantially complete cure of the tie coat precursor is typically accomplished by adjusting the time and temperature to which the tie coat precursor coated backing is exposed, where the time may be adjusted depending upon the % solids utilized in the tie coat precursor and the temperature to which a tie coat precursor-coated backing is to be exposed. For example, when a 46% solids tie coat precursor is used, curing is typically accomplished in three minutes or less in an oven at a temperature of about 90° C. to about 100° C. If further cure is desired, the tie coat precursor can then be further cured with time and/or exposure to another energy source, such as a microwave energy source. As mentioned above, prior to application of an abrasive slurry, a backing coated with a tie coat precursor is preferably exposed to sufficient thermal energy to at least partially cure the tie coat precursor.

A preferred method of making an abrasive article according to the present invention involves: introducing the abrasive slurry onto the tie-coated backing such that the abrasive slurry wets the front side (i.e., the first major surface) of the backing to form an intermediate article; introducing the intermediate article to the contacting surface of a production tool under a sufficient force to cause the abrasive slurry to assume the shape (i.e., the topography or pattern) of the contacting surface of the production tool; at least partially curing the binder precursor before the intermediate article departs from the contacting surface of the production tool to form a shaped, handleable structure; and removing the shaped, handleable structure with the backing thereon (i.e., the structured abrasive article) from the production tool. These methods can be batch processes or continuous processes, preferably, however, they are continuous processes. If a continuous process is used, the tie coat precursor can be applied and at least partially cured in line upon exposure to an energy source (e.g., thermal energy and/or microwave energy), prior to applying the abrasive slurry.

Subsequent steps another method of making conventional structured abrasive articles are described in U.S. Pat. No. 5,435,816 (Spurgeon et al.). One method involves: introducing the abrasive slurry (abrasive particles and binder precursor) onto a contacting surface of a production tool, wherein the production tool has a contacting surface with a specified topography or pattern; introducing a tie-coated backing to the contacting surface of the production tool such that the slurry wets the front surface (i.e., the first major surface) of the tie-coated backing to form an intermediate article; at least partially curing the binder precursor before the intermediate article departs from the contacting surface of the production tool to form a shaped, handleable structure; and removing the shaped, handleable structure with the backing thereon (i.e., the structured abrasive article) from the production tool.

If the production tool is made from a transparent material (e.g., a polypropylene or polyethylene thermoplastic), then either visible or ultraviolet light can be transmitted through the production tool and into the abrasive slurry to cure the binder precursor. This is further described in U.S. Pat. No. 5,435,816 (Spurgeon et al.). Alternatively, if the abrasive backing is transparent to visible or ultraviolet light, visible or ultraviolet light can be transmitted through the abrasive backing. Preferably, the production tool is radiation transmissive and allows radiation energy, particularly ultraviolet/visible light, to be transmitted therethrough.

The resulting solidifed abrasive slurry (i.e., the shaped, handleable structure or the abrasive composite) has the inverse pattern of the production tool. By at least partially curing or solidifying on the production tool, the abrasive composite has a precise and predetermined pattern. The binder can be further solidified or cured off the production tool. Preferably, the abrasive article is cured post production, i.e., after removal of the abrasive article from the production tool, at a temperature of less than about 180° C. for a period of time of about 12 hours or less, more preferably at a temperature of about 100° C. to about 120° C. for about 6 to about 10 hours.

A production tool having a plurality of precisely shaped cavities is used to make the structured abrasive article. These cavities are essentially the inverse shape of the abrasive composites and are responsible for generating the shape of the abrasive composites. The dimensions of the cavities are selected to provide the desired shape and dimensions of the abrasive composites.

The production tool can be a belt, a sheet, a continuous sheet or web, a coating roll such as a rotogravure roll, a sleeve mounted on a coating roll, or a die. The production tool can be composed of metal, (e.g., nickel), metal alloys, or plastic. The metal production tool can be fabricated by any conventional technique such as engraving, hobbing, electroforming, etching, diamond turning, and the like. One preferred technique for a metal production tool is diamond turning. It is preferably a thermoplastic production tool made from polypropylene as disclosed in U.S. Pat. No. 5,435,816 (Spurgeon et al.). The production tool may also contain a release coating to permit easier release of the abrasive composites from the production tool, such as silicones and fluorochemicals, as disclosed in U.S. Pat. No. 5,435,816 (Spurgeon et al.).

EXAMPLES

The following nonlimiting examples will further illustrate the invention. All parts, percentages, ratios, etc., are by weight unless otherwise specified. The following designations are used throughout the examples.

MSCA gamma-methacryloxypropyltrimethoxysilane, known under the trade designation A-174, commercially available from OSi Specialties, Inc., Danbury, Conn.;

ASP amorphous silica particles having an average surface area of 50 m$^2$/g, and average particle size of 0.04 microns, commercially available under the trade designation OX-50 from Degussa Corp., Ridgefield Park, N.J.;

TATHEIC triacrylate of tris(hydroxy ethyl) isocyanurate, commercially available under the trade designation SARTOMER 368 from Sartomer, Exton, Pa.;

TMPTA trimethyolpropane triacrylate, commercially available under the trade designation SARTOMER 351 from Sartomer, Exton, Pa.;

SR-368D a blend of 70 parts TMPTA and 30 parts TATHEIC containing a photoinitiator, commercially available under the trade designation SARTOMER 368D, from Sartomer, Exton, Pa.;

KB1 2,2-dimethoxy-1,2-diphenyl-1-ethanone photoinitiator commerically available under the trade designation ESA-CURE KB, from Sartomer Co., Exton, Pa.;

I-819 bis benzoyl phenyl phosphine oxide photoinitiator commerically available under the trade designation IRGACURE 819, from Ciba Geigy Corp., Hawthorne, N.Y.;

WAO white fused aluminum oxide abrasive grain, commercially available under the trade designation BZK-B from H.C. Stark Co., Laufenberg, Germany;

BTR brown aluminum oxide abrasive particles, commercially available from USEM, U.S. Electrofused Mineral, Inc., Baltimore, Md.;

GW green silicon carbide abrasive particles, commercially available under the trade designation CARB GW from Exolon-ESK Company, Tonawanda, N.Y.;

SSU a silyl terminated sulfopoly(ester-urethane) dispersion prepared from a composition including a relative number of moles of sulfopolyester polyol:polycaprolactone diol:ethylene glycol:isophorone diisocyanate of 6:3:12:22.4, as described in U.S. Pat. No. 5,929,160 (Krepski et al.);

W calcium meta silicate filler commercially available under the trade designation WOLLASTONITE from NYCO Minerals, Inc., Willsboro, N.Y.;

WSi calcium meta silicate surface treated with silane commerically available under the trade designation WOLLASTOCOAT, from NYCO Minerals, Inc., Willsboro, N.Y.;

PE-RS a backing material of 100% polyester 4/1 sateens fabric made from ring spun yarns, weighing 282 grams per square meter commercially available from Milliken and Co., Spartanburg, S.C., which was treated with a 10% nitrile latex/90% resole phenolic resin, bringing the weight to 356 grams per square meter (dry weight) and was then backsized with a filled resole phenolic resin (40% resole phenolic resin with 60% $CaCO_3$) bringing the weight to 475 grams per square meter;

PE-OE a backing material of 100% polyester 4/1 sateens fabric made from open end spun yarns weighing 326 grams per square meter commercially available from Milliken and Co., Spartanburg, S.C., which was treated with a 90% resole phenolic/10% nitrile latex resin bringing the weight to 416 grams per square meter and was subesequently backsized with a blend of 55% $CaCO_3$; 43% resole phenolic; and a small amount of $Fe_2O_3$ for color, bringing the weight to 516 grams per square meter; and Type X a readily available backing material of a 65% polyester/35% cotton blend with a 2/1 twills weave and weighing 222 grams per square meter, which was first dyed and stretched using an aqueous dispersion of organic dyes and wetting agents, bringing the weight to 245 grams per square meter and was subsequently presized with a blend of 85 parts acrylic latex and 15 parts resole phenolic resin, bringing the weight to 288 grams per square meter, and was then backfilled with a blend of 32% kaolin clay, 52% resole phenolic resin, and 13% nitrile latex with coloring agents, bringing the weight to 325 grams per square meter.

Procedure of Making Tie Coat Precursor

A silyl terminated sulfopoly(ester-urethane) tie coat precursor was prepared as follows:

A mixture of dimethyl 5-sodiosulfoisophthalate (DMSSIP, 337.3 g, 1.14 mol), diethylene glycol (DEG, 483 g, 4.55 mol, available from Aldrich Chemical Co., Milwaukee, Wis.), and zinc acetate, (0.0.822 g, available from Aldrich) was heated to 180° C. and the methanol by-product was distilled from the reaction mixture. After 4.5 hours NMR analysis of the reaction product showed that less than 1% residual methyl ester was present in the product.

Dibutyltin dilaurate (1.51 g, 2.4 mmol) was added to the above reaction product, the temperature held at 180° C., and epsilon-caprolactone (1753 g, 15.36 mol, available from Aldrich) was added portion-wise over about a 30 minute period. When addition was complete, the reaction mixture was held at 180° C. for 4 hours. The product is designated a "2:8:27" sulfopolyester polyols, because the ratio of the amounts of DMSSIP:DEG:caprolactone was 2:8:27.

Determination of the hydroxyl equivalent weight of the reaction product was as follows. A 5.12 g sample of the product mixture was dissolved in 20 mL of methyl ethyl ketone, isophorone disocyanate (2.04 g, 9.18 mmol, available from Aldrich), and dibutyltin dilaurate (0.02 g) added, and the solution heated 4 hours at 80° C. The solution was cooled to room temperature, a solution of dibutyl amine (4 mL of a 1.72 molar solution in methyl ethyl ketone) was added, and the solution stirred for 30 minutes. Then 20 mL of methanol and 4–5 drops of Bromphenol Blue indicator were added, and the solution titrated to a yellow endpoint with 3.79 mL of a 1.0 molar hydrochloric acid solution in water. This corresponded to a hydroxyl equivalent weight of 335 (theoretical hydroxyl equivalent weight for this 2:8:27 sulfopolyester polyols is 366). From a duplicate titration determination, the hydroxyl equivalent weight of the reaction product was also determined to be 335.

A sulfopolyester polyol prepared as above but with a hydroxyl equivalent weight of 320 (115.0 g, 180 mmol), polycaprolactonediol (47.2 g, 90 mmol, PCP 0201™, average molecular weight 524, available from Union Carbide Corp., Danbury, Conn.), ethylene glycol (22.4 g, 360 mmol), isophorone disocyanate (150.8 g, 678 mmol, available from Huls America, Inc., Piscataway, N.J.), and dibutyltin dilaurate (0.23 g, 0.36 mmol, available from Alfa Chemical Co., Ward Hill, Mass.) were dissolved in methyl ethyl ketone (180 g). The solution was stirred at 80° C. for 3.5 hours, then an aliquot was removed for reaction with dibutylamine and titration with hydrochloric acid solution as described above. The isocyanate equivalent weight of the product was determined to be 3491. Methyl ethyl ketone (120 g) and 3-aminopropyltriethoxysilane (20.2 g, 91.4 mmol, available from Aldrich) were added and the solution stirred 30 minutes at 80° C. Water (600 g) at 80° C. was then added to the reaction mixture over about a 5 minute period and methyl ethyl ketone was distilled from the mixture under reduced pressure to produce a dispersion (46% solids) of silanol terminated sulfo(polyester-urethane) in water. Modulated Differential Scanning Calorimetry (MDSC) and tensile property analyses made of a spun cast film produced from the dispersion indicated that the polymer had a Tg of 38° C. and a tensile strength of 33.1 MPa (4812 psi) at 378% elongation.

General Procedure for Making Tie Coated Backings

Pretreated cloth backings were knife coated with a sulfopoly(esterurethane) (SSU) 46% solids aqueous dispersion, as described above, at a rate of 7.6 m/min. Gap settings for the knife coat were 0.0 mm on all types of fabric, where the surface roughness of the backing material was used to meter the coating thickness. The tie coat was formed after drying in a tunnel oven at 99° C. Dry coating weight was 31.8 $g/m^2$ for the backing PE-RS and was 37.7 $g/m^2$ for the backing PE-OE.

General Procedure for Making Structured Abrasive Articles

The abrasive articles employing slurries of the invention were made generally in accordance with U.S. Pat. No. 5,435,816 (Spurgeon et al.), with the addition of a tie coat precursor, as described above. An abrasive slurry composition was prepared by thoroughly mixing abrasive particles with a binder precursor consisting of the compositions as tabulated below. The slurry used in each case was coated onto a tie coated backing. A radiation energy transmissive production tool was then brought into contact with the abrasive slurry such that the abrasive slurry filled the tooling pattern, described as follows. The production tool and the process to make the production tool used are described in U.S. Pat. No. 5,681,217 (Hoopman et al.)

The specific abrasive composites formed by the production tool in the abrasive articles of Examples 1,2, and Comparative Examples A and B was such that no two adjacent composites had the same shape, that is, the angles between the individual pyramidal composites were random as were the lengths of the sides of the pyramids. The minimum and maximum angles between two adjacent pyramids were 30 degrees and 90 degrees, respectively. The minimum and maximum pyramid side lengths were 584 and 1016 micrometers, repsectively.

The specific abrasive composites formed by the production tool used in Examples 4, 5, 6, and Comparative Example D were 355 micrometers high and had a minimum and maximum pyramid side lengths of 409 and 711 micrometers, respectively.

The specific abrasive composites formed by the production tool used in Example 3 and Comparative Example C all were substantially identical with a height of 350 micrometers and each having four sides with a length of 1016 micrometers.

In forming an abrasive article, the tie coated-cloth coated with the abrasive slurry was pressed against the production tool by means of a nip roll so that the slurry was pressed into the tool pattern. Ultraviolet/visible light was concurrently transmitted through the polypropylene tool and into the abrasive slurry containing the binder precursor. The ultraviolet/visible light initiated the polymerization of the radiation curable resin of the binder precursor, resulting in the abrasive slurry being transformed into an abrasive composite, with the abrasive composite being adhered to the cloth backing. The ultraviolet/visible light sources used were two bulbs known under the trade designation Fusion Systems D bulbs, which operated at 236 watts/cm of bulb width and the line speeds are given below. Finally, the cloth/abrasive composite was separated from the polypropylene production tool, providing a coated abrasive article.

Test Procedures

The following test procedures were used to test structured abrasive articles made according to the examples.

90° Peel Test

In order to measure the degree of adhesion of the structured abrasive layer to the backing, the sheet to be tested was converted into a sample about 8 cm wide by 25 cm long. One-half the length of a wooden board (17.78 cm by 7.62 cm by 0.64 cm thick) was coated with an adhesive. The entire width of, but only the first 15 cm of the length of, the coated abrasive sample was coated with an adhesive on the side bearing the abrasive material. The adhesive was 3M Jet Melt Adhesive #3779, which is commercially available from 3M Company, St. Paul, Minn., applied with a Polygun II. Then, the side of the sample bearing the abrasive material was attached to the side of the board containing the adhesive coating in such a manner that the 10 cm of the abrasive sample not bearing the adhesive overhung from the board. Pressure was applied such that the board and the sample were intimately bonded, and sufficient time was allowed for the adhesive to cool and solidify.

Next, the sample to be tested was scored along a straight line such that the width of the coated abrasive test specimen was reduced to 5.1 cm. The resulting abrasive sample/board composite was mounted horizontally in a fixture attached to the upper jaw of a tensile testing machine having the trade designation SINTECH, and approximately 1 cm of the overhanging portion of the abrasive sample was mounted into the lower jaw of the machine such that the distance between jaws was 12.7 cm. The machine separated the jaws at a rate of 0.5 cm/second, with the coated abrasive sample being pulled at an angle of 90° away from the wooden board so that a portion of the sample separated from the board. Separation occurred between layers of the abrasive construction. The machine charted the force per centimeter of specimen width required for separation. The higher the required force, the better the shelling resistance of the abrasive construction.

Some of the articles of the examples were tested for 90° peel adhesion. The force required for separation was expressed in kg/cm. It is preferred that the force value be at least 1.8 kg/cm, more preferably at least 2 kg/cm, because inadequate adhesion and weakness at the structured abrasive layer-cloth interface will generally results in inferior performance particularly under dynamic conditions.

The data shown in the table below for this test procedure is an average of two data points.

Wet Rocker Drum Test

Unflexed structured abrasive articles were converted into 10.2 cm by 15.2 cm sheets. These sheets of structured abrasive articles were then soaked for a minumun of 12 hours in water at room temperature prior to tesing. These samples were installed on a cylindrical steel drum of a testing machine which oscillates (rocks) back and forth in a small are creating a 1.3 cm by 10.1 cm wear path. The structured abrasive abraded the stationary 1.3 cm by 1.3 cm by an initial height of 15.2 cm Type 1018 carbon steel workpiece. There were approximately 60 strokes per minute on this wear path. The load applied to the workpiece via a lever arm was 3.6 Kg. During testing, water was dropped onto each wear path at a rate of one drop per second to keep the sample damp. The total amount of carbon steel removed after 500 cycles (i.e., one cycle being one back-and-forth motion) was recorded as the total cut. The results are reported in the tables below as an average of four test specimens. This is referred to herein as a Wet Rocker Drum Test and the data shown in the table below is an average taken from testing 4 samples of the Examples.

ELB Grinding Tests

In order to determine properties in the context of grinding 1018 steel, an ELB Grinding Test was conducted. Coated abrasives were converted to 168 cm by 7.6 cm continuous belts and installed on an ELB reciprocating bed grinding machine available from ELB Grinders Corp., Mountainside, N.J., under the trade designation "ELB Type SPA 2030ND." Wet grinding utilized water as a lubricant.

The effective cutting area of the abrasive belt was 7.6 cm by 168 cm. The workpiece abraded by these belts was 1018 steel of these dimensions: 2.5 cm width by 35.6 cm length by 10.2 cm initial height for the wet grinding tests and 1.27 cm. width by 35.6 cm. by length by 10.2 cm initial height for the dry grinding tests. Abrading was conducted along the 2.5 cm by 35.6 cm edge for wet grinding and along the 1.27 cm by 35.6 cm edge for the dry grinding. The 1018 steel workpiece was mounted on a reciprocating table. The speed of the abrasive belt was 1707 surface meters per minute. The table speed, at which the workpiece traversed, was 6.1 meters per minute. The downfeed increment of the abrasive belt varied from 0.013 to 0.025 mm/pass of the workpiece, as indicated in Table 2. The process used was conventional surface grinding wherein the workpiece was reciprocated beneath the rotating abrasive belt with incremental downfeeding between each pass. This grinding was carried out wet for some of the evaluations and dry for other, as designated in Table 2. The coolant or lubricant was circulated at 23 liters/min.

The normal force ($F_n$) was monitored during grinding of the 1018 steel. As grinding proceeds, the normal force increases. In general, the lower the normal force, the better the belt is performing the grinding of the workpiece. The total amount of 1018 steel cut in grams is reported in Table 1 for each abrasive example evaluated. The endpoint utilized is as the normal force exceeds approx. 293 Newtons [66 lb.] (shelling) end point.

EXAMPLES

The binder precursor for Comparative Examples A, B, and C and Examples 1, 2, and 3 was the following formulation: 0.27% KB1, 2.74% MSCA, 54.79% 60/40 TMPTA/TATHEIC, 1.1% ASP, and 41.1% WSi. The abrasive slurry used in Examples 1 and 2 and Comparative Examples A and B included 52% binder precursor and 48% grade 180 BTR abrasive particles, and is designated as abrasive slurry "2" in the table below. The abrasive slurry used in Example 3 and Comparative Example C included 52% binder precursor and 48% of a 50/50 blend of grade P100 and grade P320 WAO abrasive particles, and is designated abrasive slurry "2" in the table below.

The binder precursor for Comparative Example D and Examples 4, 5, and 6 was 59.5% SR 368D, 1.2% ASP, 0.6% I-819, and 38.7% W. The abrasive slurry for Comparative Example D and Examples 4 and 5 included 62% of the binder precursor and 38% of grade F240 GW abrasive particles, and is designated abrasive slurry "3" in the table below. The abrasive slurry for Example 6 included 62% of the binder precursor and 38% of a blend of 28.5% grade F240 GW and 9.5% grade F1000 GW abrasive particles, and is designated abrasive slurry "4" in the table below.

The following table summarizes the components used in the abrasive articles evaluated.

TABLE 1

| Example | Backing | Tie Coat Precursor | Line Speed (m/min.) | Abrasive Slurry |
| --- | --- | --- | --- | --- |
| Comp. Ex. A | Type X | TMPTA/TATHEIC | 15.2 | 1 |
| Example 1 | PE-RS | SSU | 15.2 | 1 |
| Example 2 | PE-OE | SSU | 15.2 | 1 |
| Comp. Ex. B | PE-RS | None | 15.2 | 1 |
| Comp. Ex. C | Type X | None | 15.2 | 2 |
| Example 3 | PE-RS | SSU | 15.2 | 2 |
| Comp. Ex. D | Type X | None | 22.9 | 3 |
| Example 4 | PE-OE | SSU | 22.9 | 3 |
| Example 5 | PE-RS | SSU | 22.9 | 3 |
| Example 6 | PE-RS | SSU | 22.9 | 4 |

For Comparative Example A, which included a tie coat, the Type X backing was tie coated as described in U.S Pat. No. 5,700,302 (Stoetzel et al.) with a 60/40 blend of TMPTA/TATHEIC with 1% KB1 at about 32 grams per square meter coating weight.

Abrasive articles from Examples 1–3 and Comparative Examples A, B, and C were then tested using the Wet Rocker Drum Test and wet and dry ELB Grinding Tests, each as described above. The results are shown in the table below.

TABLE 2

| Example | Weight g/m² | WET ROCKER DRUM (500 Strokes) Cut (g.) | Caliper Loss (mm) | WET ELB Cut (g.) 0.013 mm/pass | WET ELB Cut (g.) 0.026 mm/pass | DRY ELB Cut (g.) 0.02 mm/pass |
| --- | --- | --- | --- | --- | --- | --- |
| Comp. Ex. A | 879 | 0.14 | 0.21 | 485 | | 153 |
| Example 1 | 1079 | 0.13 | 0.18 | 388 | | 243 |
| Example 2 | 1155 | 0.14 | 0.17 | 485 | | 175 |
| Comp. Ex. B | 1152 | 0.14 | 0.19 | 518 | | NO DATA |
| Comp. Ex. C | 889 | 0.34 | 0.2 | | 332 | 364 |
| Example 3 | 1099 | 0.34 | 0.21 | | 343 | 300 |

As shown from the data in Table 2, the inclusion of a tie coat in accordance with the present invention did not significantly affect the grinding performance of the abrasive articles as compared to abrasive articles described in U.S. Pat. No. 5,700,302 (Stoetzel et al.) (Comparative Example A) and those without the tie coat (Comparative Examples B–C).

The abrasive articles in Examples 1–6 and Comparative Examples A–D were then evaluated to test adhesion using the 90° Peel Test, as described above. The results are shown in Table 3. In this instance "cured" refers to the abrasive article (i.e., an abrasive article including an abrasive layer and a tie layer, if present) that has been post production cured, i.e., thermally cured at 10 hours at 115° C. "Uncured" refers to an abrasive article which was not thermally post production cured.

TABLE 3

| | Adhesion Force (kg/cm) | |
| --- | --- | --- |
| Example | UNCURED | CURED |
| Comp. Ex. A | 2.42 | 2.24 |
| Example 1 | 3.04 | 2.56 |
| Example 2 | 1.38 | 3.02 |
| Comp. Ex. B | 0.86 | 0.86 |
| Comp. Ex. C | 2.4 | 2.08 |
| Example 3 | 2.99 | 2.72 |
| Comp. Ex. D | 2.61 | 2.34 |
| Example 4 | 1.4 | 3.01 |
| Example 5 | 1.23 | 2.79 |
| Example 6 | 0 | 0 |

The data shown in Table 3 indicate that Examples 1–5, abrasive articles in accordance with the present invention having a cured tie coat, showed enhanced adhesion as compared to the adhesion of each of the Comparative Examples. Example 6 demonstrated substantially no adhesion because the abrasive slurry did not completely cure. It is believed that the abrasive particles (grade F1000 silicon carbide abrasive particles having an average particle size of about 6 microns) included in the abrasive slurry were so fine that a sufficient amount of UV energy was blocked such that curing of the binder precursor did not occur. Therefore, it is believed that it was the small average particle size in combination with the particle type that did not allow the complete curing of the abrasive slurry in Example 6. It is further believed that a smaller particle size of another type of abrasive particles would not exhibit this problem, such as aluminum oxide, garnet, and zirconia abrasive particles, for example.

The complete disclosures of all patents, patent applications, and publications are incorporated herein by reference as if individually incorporated. Various modifications and alterations of this invention will become apparent to those skilled in the art without departing from the scope and spirit of this invention, and it should be understood that this invention is not to be unduly limited to the illustrative embodiments set forth herein.

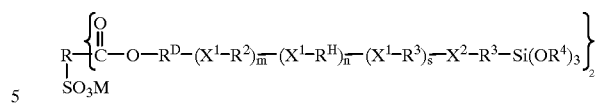

wherein
R is a $C_6$–$C_{12}$ aryltriyl or $C_1$–$C_{20}$ aliphatic triyl group and M is a cation, or

is selected from the group consisting of:

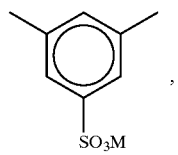

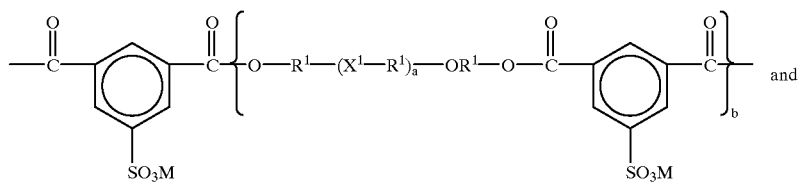 and

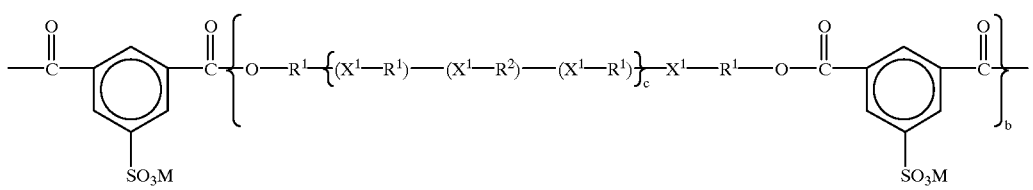

What is claimed is:

1. An abrasive article comprising:

a backing having a first major surface;

a tie coat on the first major surface of the backing formed from a tie coat precursor comprising a sulfopoly(ester-urethane) component comprising in its backbone at least one non-terminal arylene or alkylene group comprising a pendant sulfonic acid group or salt thereof having the formula:

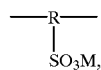

wherein R is a trivalent aliphatic or aromatic group and M is a cation, said aliphatic or aromatic group being bonded directly to ester groups and wherein the polymer is terminated by at least one hydrolyzable silyl group; and an abrasive layer on the tie coat, wherein the abrasive layer is formed form a plurality of abrasive particles dispersed in a binder precursor.

2. The abrasive article of claim 1 wherein the sulfopoly (ester-urethane) component has the structural formula:

wherein a is a number from 1 to 10,
b is a number from 1 to 4, and
c is a number from 1 to 15,
wherein m=0 or 1, n=0 or 1, s=0 or 1, with the proviso that independently,
one of m or n must be equal to 1,
$R^D$ is 1) at least one of a divalent linear or branched organic group of 20 to about 150 carbon atoms in units of 2 to 12 methylene groups and arylene groups of 6 to 10 carbon atoms separated by at least one of 1 to 50 catenary oxygen atoms and by 1 to 30 oxycarbonyl groups according to the formula

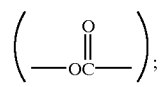

or
$R^D$ is 2) an organic group selected from the group consisting of a linear or branched alkylene group having 2 to 12 carbon atoms, a cyclopentamethylene group, a cyclohexamethylene group, a 5- or 6-membered azacyclic group, a phenylene group, a naphthalene group and a phenylenemethylenephenylene group, the organic group optionally being substituted by up to four lower alkyl groups having 1 to 4 carbon atoms and a total of up to 15 carbon atoms; or $R^D$ includes 3) the structure $\{-R^1-(X^1-R^2-X^1-R^1)_p-\}$ where p is an integer from 1 to 5, produced by the reaction of a polyol with an isocyanate having the structure OCN—$R^2$—NCO to produce a segment having a molecular weight of from 500 to 4,000;

$R^1$ is a linear or branched alkylene group having 2 to 12 carbon atoms, or an arylene group having 6 to 10 carbon atoms;

$X^1$ is

wherein $R^1$ optionally comprises an oligomeric segment;

$R^2$ is an organic group wherein the organic group optionally is substituted by up to four lower alkyl groups having 1 to 4 carbon atoms and a total of at most 15 carbon atoms;

$X^2$ is

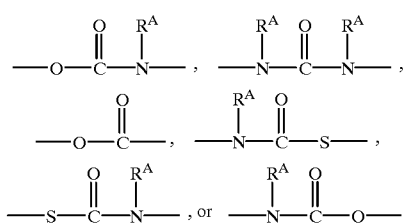

wherein $R^A$ is hydrogen or lower alkyl having 1 to 4 carbon atoms;

$R^H$ is a divalent hydrophobic group selected from divalent oligomeric siloxanes having the structure

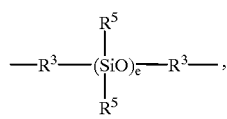

divalent organic groups having the structure

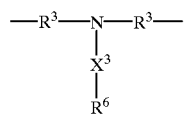

comprising a pendant alkyl group;
or divalent organic groups having one of the structures

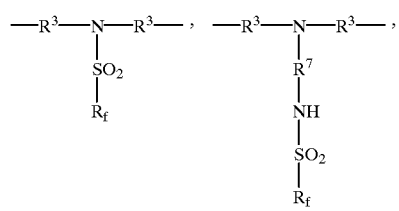

or quaternary salts thereof, wherein $R_f$ is a fluorocarbon pendant group; and
$R^3$ is a divalent organic group;

$R^4$ is a monovalent lower alkyl group having 1 to 4 carbon atoms;

$R^5$ is a monovalent group selected from the group consisting of alkyl groups of one to about twelve carbon atoms, aryl having 6 to 10 carbon atoms and aralkyl groups having 6 to 10 carbon atoms, with at least 70% of $R^5$ being methyl;

e is an integer of from about 10 to about 300;

$X^3$ is a covalent bond, a carbonyl group according to the formula

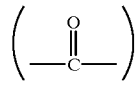

or an amide group according to the formula

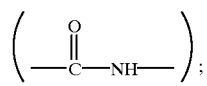

$R^6$ is a monovalent group selected from the group consisting of alkyl groups of about 4 to about 60 carbon atoms; and $R^7$ is a divalent group selected from the group consisting of alkylene groups of 2 to about 12 carbon atoms.

3. The abrasive article of claim 2 wherein $R^1$ further comprises an oligomeric segment selected from the group of a polyester or a polylactone segment.

4. The abrasive article of claim 2 wherein M is selected from the group of an alkali metal, an alkaline earth metal, a primary ammonium cation, a secondary ammounium cation, a tertiary ammonimum cation, and a quaternary ammonium cation.

5. The abrasive article of claim 4 wherein the primary, secondary, tertiary, or quaternary ammonium cation are selected from the group consisting of ammonium, methylammonium, butylammonium, diethylammonium, triethylammonium, tetraethylammonium, and benzyltrimethylammonium cation, respectively.

6. The abrasive article of claim 2 with the proviso that when R is aliphatic it is an alkylene group.

7. The abrasive article of claim 2 wherein the organic group of $R^D$ comprises an organic group chain extended by a transesterification reaction between a diol terminated ester precursor and a lower aliphatic diester of an aliphatic diacid having from 2 to 12 carbons or an aromatic diacid having from 8 to 12 carbons or reaction between a diol terminated ester precursor and an aliphatic lactone of 3 to 20 carbons.

8. The abrasive article of claim 2 wherein the organic group of $R^2$ is selected from the group consisting of a linear or branched alkylene group having 2 to 12 carbon atoms, a cyclopentamethylene group, a cyclohexamethylene group, a 5- or 6-membered azacyclic group, a phenylene group, a naphthalene group, a phenylenemethylenephenylene group and arylene group.

9. The abrasive article of claim 8 wherein the organic group of $R^2$ is selected from the group consisting of a residue remaining after removal of isocyanate groups from a polyisocyanate selected from the group consisting of hexamethylene diisocyanate, bis(4-isocyanatocyclohexyl) methane, 1,3-bis(isocyanatomethyl)cyclohexane, isophorone diisocyanate, 1,3-bis(1-isocyanato-1-methylethyl) benzene, 4,4'-diphenylmethane diisocyanate and a residue remaining after removal of isocyanate groups from isocyanates produced by the trimerization reactions of diisocyanates.

10. The abrasive article of claim 2 wherein $R_f$ comprises a monovalent saturated fluoroaliphatic group having 6 to 12 carbon atoms, at least four of which are fully-fluorinated carbon atoms.

11. The abrasive article of claim 1 wherein the backing comprises a material selected from the group consisting of a polymeric film, a cloth, a paper, a vulcanized fiber, a nonwoven web, and a combination thereof.

12. The abrasive article of claim 1 wherein the backing comprises a treated cloth backing.

13. The abrasive article of claim 1 wherein the backing has applied thereon a treatment coat selected from the group consisting of a saturant coat, a presize coat, a backsize coat, a subsize coat, a backfill coat, a frontfill coat, and a combination thereof.

14. The abrasive article of claim 1 wherein the abrasive layer comprises a structured surface.

15. The abrasive article of claim 14 wherein the structured surface comprises a plurality of precisely shaped composites.

16. The abrasive article of claim 1 wherein the binder precursor comprises a material that cures by a mechanism selected from the group consisting of a cationic curing system, a free-radical curing system, a dua-cure system, and a hybrid-cure system.

17. The abrasive article of claim 1 wherein the binder precursor comprises an acrylate monomer and an isocyanurate derivative having at least one pendant acrylate group.

18. A method of preparing an abrasive article, the method comprising:

(a) providing a backing having a first major surface;

(b) coating the first major surface of the backing with a tie coat precursor comprising a sulfopoly(ester-urethane) component comprising in its backbone at least one non-terminal arylene or alkylene group comprising a pendant sulfonic acid group or salt thereof having the formula:

wherein R is a trivalent aliphatic or aromatic group and M is a cation, said aliphatic or aromatic group being bonded directly to ester groups and wherein the polymer is terminated by at least one hydrolyzable silyl group;

(c) applying an abrasive slurry to the first major surface of the backing after coating the tie coat precursor thereon, wherein the abrasive slurry comprises a plurality of abrasive particles dispersed in a binder precursor;

(d) at least partially curing the tie coat precursor; and (e) at least partially curing the binder precursor to form an abrasive article.

19. The method of claim 18 wherein the step of at least partially curing the tie coat precursor occurs prior to the step of applying an abrasive slurry to the first major surface of the backing.

20. The method of claim 18 wherein the step of at least partially curing the tie coat precursor comprises exposing the tie coat precursor to thermal energy.

21. The method of claim 18 further comprising exposing the abrasive article to thermal energy after at least partially curing the binder precursor.

22. The method of claim 18 wherein the backing comprises a treated cloth.

23. The method of claim 18 which is a continuous process.

24. The method of claim 18 wherein the binder precursor comprises an acrylate-functional compound.

25. The method of claim 18 wherein the binder precursor comprises an acrylate monomer and an isocyanurate derivative having at least one pendant acrylate group.

26. The method of claim 18 wherein the binder precursor further comprises a photoinitiator.

27. An abrasive article made by the method of claim 18.

28. An abrasive article made by the method of claim 23.

29. The abrasive article of claim 1, wherein $R^3$ is selected from the group consisting of linear alkylene groups having from 2–12 carbon atoms, branched alkylene groups having 2–12 carbon atoms and arylene groups having from 6–20 carbon atoms.

* * * * *

UNITED STATES PATENT AND TRADEMARK OFFICE
CERTIFICATE OF CORRECTION

PATENT NO. : 6,139,594
DATED : October 31, 2000
INVENTOR(S) : Don H. Kincaid, Scott R. Culler, Larry R. Krepski, and Daniel E. Mickus It is certified that error appears in the above-identified patent and that said Letters Patent is hereby corrected as shown below:

Column 1,
Line 29, "or flexibility. however, it" should be -- or flexibility. However, it --

Column 28,
Line 38, "back and forth in a small are creating a" should be -- back and forth in a small arc creating a --

Signed and Sealed this

Fourth Day of December, 2001

Attest:

NICHOLAS P. GODICI
Attesting Officer  Acting Director of the United States Patent and Trademark Office